Oct. 28, 1969   J. C. KREJCI   3,475,125
PRODUCTION OF CARBON BLACK
Filed Dec. 23, 1966   2 Sheets-Sheet 1

INVENTOR.
J. C. KREJCI
BY *Young and Quigg*
ATTORNEYS

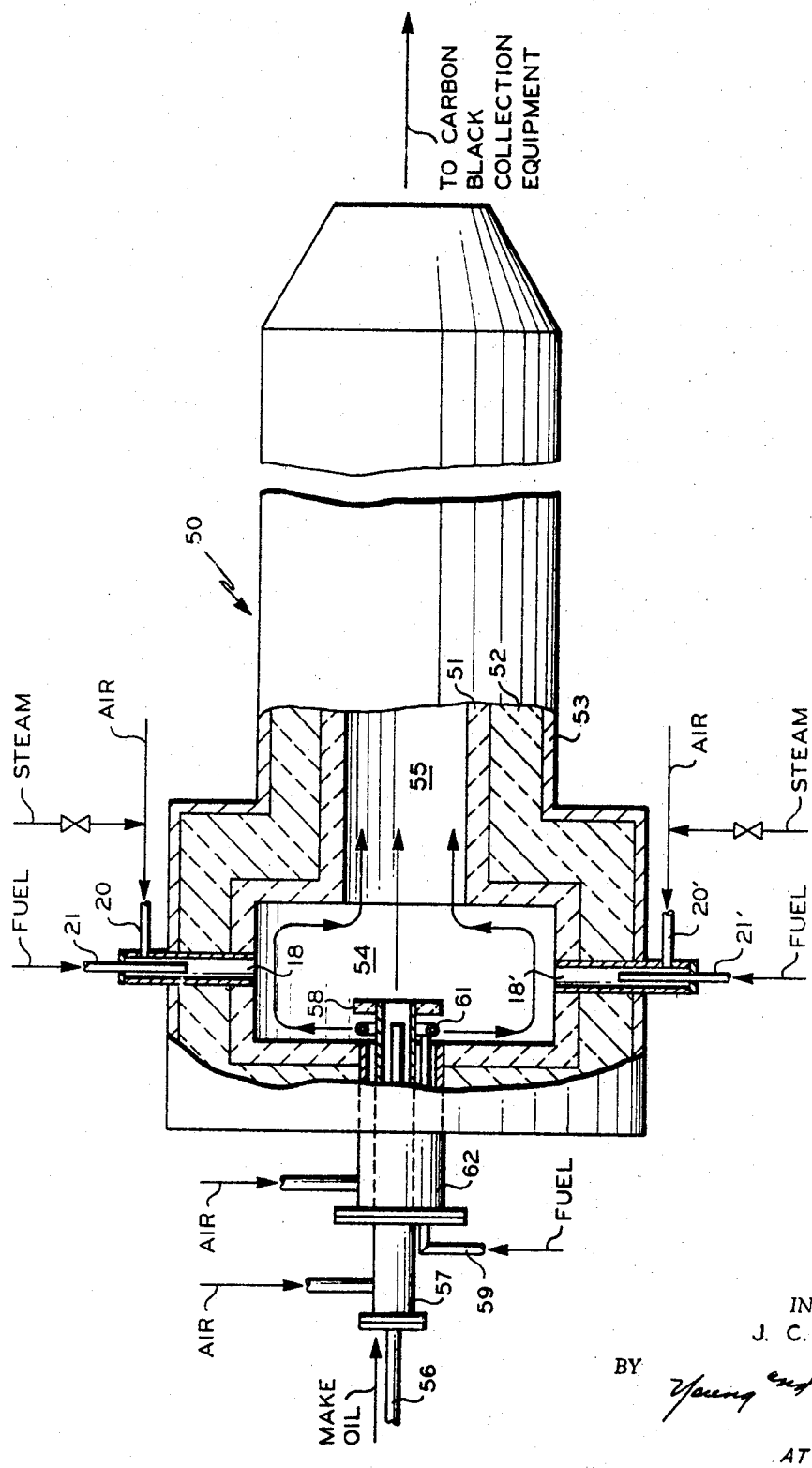

United States Patent Office

3,475,125
Patented Oct. 28, 1969

3,475,125
PRODUCTION OF CARBON BLACK
Joseph C. Krejci, Phillips, Tex., assignor to Phillips
Petroleum Company, a corporation of Delaware
Filed Dec. 23, 1966, Ser. No. 604,306
Int. Cl. C09c 1/50
U.S. Cl. 23—209.4                                        4 Claims

ABSTRACT OF THE DISCLOSURE

A process for the production of furnace carbon black wherein combustion gases are introduced into the reaction zone to supply heat to the reaction by introducing into the reaction zone a plurality of combustion gas streams at least one of which is produced with the stoichiometric amount of oxygen in the presence of steam, and one of which is produced with an amount of oxygen in excess of the stoichiometric requirement.

---

This invention relates to the production of carbon black.

For several years carbon black has been produced in large quantities in furnaces. In one particularly outstanding successful process, a furnace is employed which comprises a generally cylindrical first section or zone having a diameter greater than its length. Said first section or zone is axially aligned with and in open communication with a second section or zone having a length greater than its diameter and a diameter less than the diameter of said first section. A fuel and an oxidant in combustible proportions are introduced into at least one tunnel combustion zone which communicates with said first zone. Combustion of said fuel and said oxidant is substantially completed in said tunnel and the resulting hot combustion gases are introduced into said first zone. A hydrocarbon feedstock is introduced along the longitudinal axis of said first zone and while surrounded by a moving blanket of said hot combustion gases passes into said axially aligned second zone. Carbon black is formed in said first and second sections or zones by the decomposition of said feedstock and is recovered from the gaseous effluent from said second section or zone.

When the combustible mixture which is burned to supply said hot combustion gases is essentially a stoichiometric mixture, the heat release obtained approaches the maximum and the resulting temperatures are excessive for most commercially available refractory materials. Thus, a common practice in the operation of such furnaces as described above in accordance with the prior art is to burn a combustible mixture in said tunnel inlet zones which contains an excess of oxidant, e.g., air.

It is desirable for economic reasons to obtain the maximum yield of carbon black from the hydrocarbon feedstock. I have now discovered that the yield of carbon black from said hydrocarbon feedstock can be increased by operating in a manner to supply to said first zone at least one stream of hot combustion gases obtained by burning in one combustion zone a first combustible mixture of a hydrocarbon fuel and an oxidant which contains substantially the stoichiometric amount of oxidant required for the burning of said fuel, said first combustible mixture being burned in the presence of steam present in an amount sufficient to protect the refractory lining of said combustion zone from excessive temperature. Preferably, there is also supplied to said first zone at least one other stream of hot combustion gases which is obtained by burning a second combustible mixture of a hydrocarbon fuel and an oxidant containing an amount of oxidant which is greater than the stoichiometric amount required for the burning of said fuel.

An object of this invention is to provide an improved process for the production of carbon black. Another object of this invention is to provide an improved process for producing furnace carbon blacks in increased yield. Another object of this invention is to provide a process for producing an increased yield of a furnace carbon black from a hydrocarbon feedstock without subjecting the refractories of the carbon black furnace to excessive temperatures. Other aspects, objects, and advantages of the invention will be apparent to those skilled in the art in view of this disclosure.

Thus, in accordance with the invention, there is provided, in a process for producing carbon black wherein, a combustible mixture of a fuel and an oxidant is burned in each of a plurality of refractory lined combustion zones which communicate with a generally cylindrical first zone having a diameter greater than its length and the resulting streams of hot combustion gases are introduced into said first zone, a reactant hydrocarbon feedstock is introduced along the longitudinal axis of said first zone, said feedstock surrounded by a moving blanket of hot combustion gases passes into an axially aligned generally cylindrical second zone having a length greater than its diameter, and carbon black product is recovered from the gaseous effluent from said second zone, the improvement comprising: producing at least one of said streams of hot combustion gases by burning in one of said combustion zones a first combustible mixture of a hydrocarbon fuel and oxidant which mixture contains an amount of oxidant which is substantially stoichiometric for the burning of said fuel, said first combustible mixture being burned in the presence of an amount of steam which is sufficient to protect the refractory lining of said combustion zone.

The only requirements on the proportions of fuel and oxidant which are burned to produce said streams of hot combustion gases are that at least one of the combustible mixtures which is burned must contain substantially the stoichiometric amount of oxidant and at least one other combustible mixture which is burned must contain more than the stoichiometric amount of said oxidant, and that said proportions be such that stable combustion conditions are obtained. It is presently preferred that the combustible mixture (or mixtures) which contains substantially the stoichiometric amount of exidant will contain from about 90 to about 110 percent of oxidant, and that said combustible mixture (or mixtures) which contains more than the stoichiometric amount of oxidant will contain from about 125 to about 190 percent of oxidant.

A number of advantages are obtained in the practice of the invention. Included among these advantages is the increase in yield of carbon black, as mentioned above. Another advantage is the protection of the refractories of the furnace from excessive temperatures, as mentioned above. The invention makes it possible to control the temperatures in the inlet tunnels to said furnace zone by regulating the proportions of fuel and oxidant used to produce the hot combustion gases which are introduced into said first zone. If desired, the oxidant, e.g., air, can be preheated. This permits more efficient operations over a broader stoichiometric range than can otherwise be employed.

The amount of steam used in the practice of the invention can be varied over rather wide limits. In all instances the amount of steam used will be an amount which is sufficient to protect the refractory in the inlet combustion tunnel(s) and/or said first zone from excessive temperatures. The actual amount of steam used in any particular instance will depend upon several more or less interrelated factors, such as the type of refractory employed in the furnace, whether or not oxidant preheat is being used, the temperature of the steam, etc. Thus, the actual amount of steam used in any particular instance is not of the essence of the invention. As a guide in practicing the invention, the amount of steam used will usually be in the range of from 5 to 125 volume percent of the volume of oxygen in the oxidant or free oxygen containing gas which is used.

The oxidant most commonly used in the practice of the invention is air. Air is usually preferred for convenience and for reasons of economy. However, other free oxygen-containing gases can also be used. Thus, the oxidant or free oxygen-containing gas can be air enriched with oxygen, essentially pure oxygen, or mixtures of oxygen with other gases. For convenience, the invention will be further described in terms of using air as the oxidant or free oxygen-containing gas. However, it is to be understood that the invention is not limited to the use of air.

The fuel used in forming the combustible mixtures burned to produce the hot combustion gases introduced into said first zone can be any suitable fuel, either liquid, solid, or gaseous. Generally speaking, a gaseous fuel, such as natural gas, or other normally gaseous hydrocarbons is preferred. Liquid hydrocarbon fuels are the next most preferred fuel.

FIGURE 3 is a view, partly in cross section, of another type of furnace which can be employed in the practice of the invention.

Figure 1:
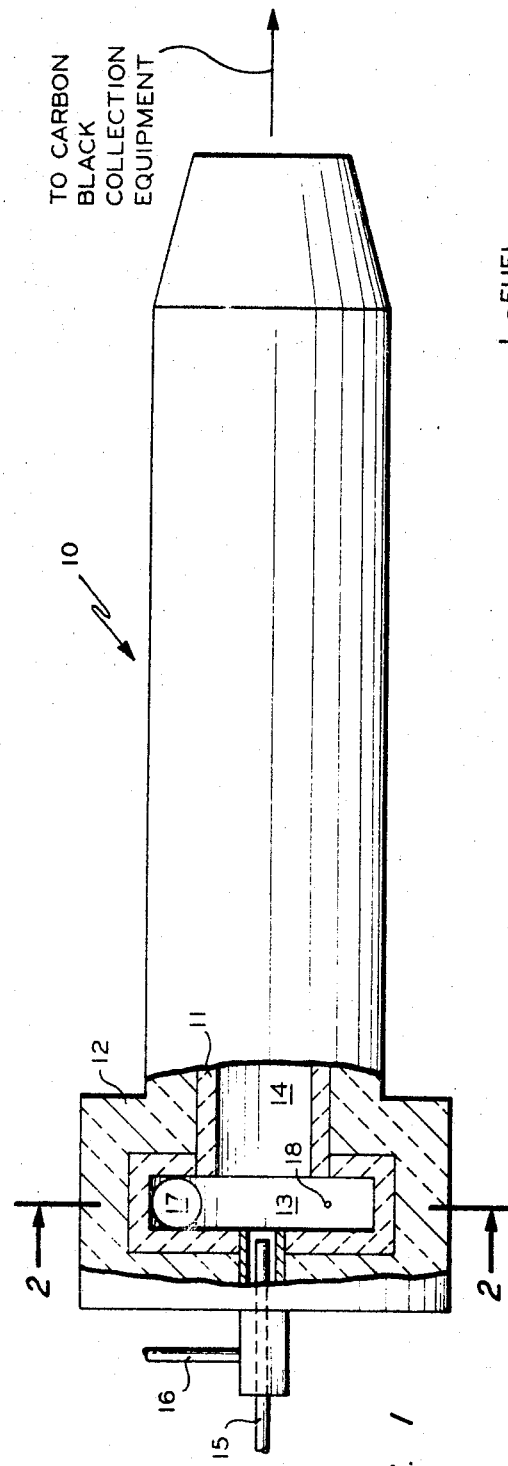
FIGURE 1 is a view, partly in cross section, of one presently preferred type of furnace which can be employed in the practice of the invention.
Figure 2:
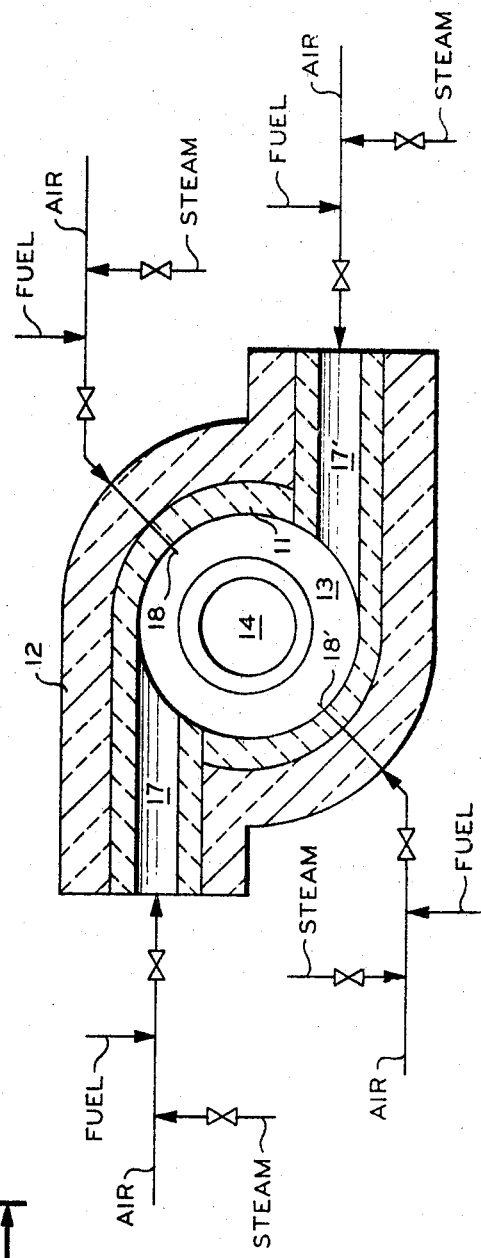
FIGURE 2 is a cross section taken along the lines 2—2 of FIGURE 1.

Referring now to the drawings, wherein like reference numerals are employed to denote like elements, the invention will be more fully explained. FIGURES 1 and 2 illustrate one presently preferred furnace 10 comprising a refractory, such as ceramic, lining 11 encased in an insulating shell 12. A metal shell (not shown in FIGURE 1) usually encases the entire furnace assembly. The ceramic lining is shaped to form first section or zone 13 and second section or zone 14. Said second section 14 is axially aligned with and is smaller in diameter than said first section 13, and its length is greater than its diameter. The length of said first section 13 is less than its diameter. An axially disposed inlet conduit 15 is positioned in the end wall of first section 13 as shown. If desired a spray nozzle can be positioned on the downstream end of conduit 15 to spray conversion or "make" oil into chamber 13. If the "make" hydrocarbon or feedstock is vaporous, the downstream end of conduit 15 is usually open.

Surrounding said feed conduit 15 is a larger conduit which provides an annular space surrounding said feed conduit. A small amount of air is passed via conduit 16 into said annular space. This "jacket air" is not essential. Only sufficient air is used to prevent possible carbon deposition on the outlet of conduit 15 and/or protect said conduits from possible excessive temperatures in section 13.

Said section 13 is provided with tangential inlet tunnels 17 and 17' which are usually two in number, although more than two can be employed. If desired, said first section 13 can also be provided with radial inlets 18 and 18' in addition to or instead of said tangential inlets 17 and 17'. Said radial inlets 18 and 18' can be structurally similar to said tangential inlets 17 and 17', but are here shown schematically so as to simplify the drawings. Said radial inlets can be more than two in number if desired. It is also within the scope of the invention to employ one tangential inlet and one radial inlet, if desired.

The steam used in the practice of the invention can be introduced into the inlet combustion tunnels by any suitable means. It is preferred that said steam be mixed with the air prior to the contacting of the air and fuel, as indicated in the drawings, so as to obtain uniform distribution of the steam. However, it is within the scope of the invention to inject said steam directly into the inlet combustion tunnels. It is also within the scope of the invention to form said steam in situ in said combustion tunnels by injecting a fine spray of water.

In carrying out one presently preferred embodiment of the invention, a combustible mixture of a fuel and air is introduced into each of the tangential inlet tunnels 17 and 17' which communicate tangentially with first zone 13. Any suitable means can be employed for introducing said combustible mixtures into said inlet tunnels 17 and 17', e.g., that shown in U.S. Patent 2,780,529. The mixture introduced into one of said tunnels, e.g., 17, will contain more than the stoichiometric amount of air necessary for burning the fuel contained in said mixture. The mixture introduced into the other of said inlet tunnels, e.g., 17', will contain substantially the stoichiometric amount of air necessary for the burning of the fuel contained therein. Burning of said combustible mixtures is initiated in said tunnels. The mixture burned in tunnel 17' is burned in the presence of an amount of steam which is sufficient to protect the refractory lining of said tunnel from excessive temperature. Said steam is mixed with the air prior to mixing of the fuel with the air. The hot combustion gases from said tunnel inlet zones follow a spiral path around said first zone 13 toward the axis thereof. Said hot combustion gases form a blanket surrounding the hydrocarbon feedstock introduced via conduit 15 and said feedstock and decomposition products therefrom, while surrounded by said hot combustion gases, pass into said second zone 14. Carbon black product is recovered from the gaseous effluent from said zone 14 by any suitable means known to the art.

FIGURE 3 illustrates another reactor 50 which can be employed in the practice of the invention. Said reactor 50 comprises a refractory lining 51 encased in an insulating shell 52. A metal shell 53 usually encases the entire reactor assembly. The refractory lining is shaped to form first section or zone 54 and second section or zone 55. Said second section 55 is smaller in diameter than first section 54 and its length is greater than its diameter, as in FIGURE 1. The length of first section 54 is less than its diameter, also as in FIGURE 1. An axial inlet conduit 56 is positioned in the end wall of chamber 54. If desired, a spray nozzle can be positioned on the downstream end of conduit 56 to spray nonvaporous conversion or "make" oil into chamber 54. If desired, air can be introduced into the annulus between conduit 56 and conduit 57 to jacket the stream of feedstock exiting the outlet of conduit 56. Secured to the end of conduit 57 and positioned within first section 54 is a circular deflector 58 constructed of refractory material. A fuel inlet conduit 59 is also positioned in the end wall of combustion chamber 54 and has attached to its downstream end a ring member 61 provided with a plurality of ports around its periphery for injecting a disc-shaped spray of fuel toward the circumferential surface of first section 54. A stream of combustion supporting oxidant such as air is introduced through conduit 62 which surrounds fuel conduit 59 and conduit 57 so as to provide a combustible mixture with the fuel exiting the ports of ring 61. Upon ignition of the fuel and oxidant, the combustion gases follow a flow pattern indicated by the arrows around the periphery of first section 54 and into second section 55.

Hydrocarbon fuel can be introduced to the radial inlets 18 and 18' via conduits 21 and 21' and air can be introduced to the inlets 18 and 18' by means of conduits 20 and 20'. Any other suitable means such as that described above in connection with FIGURES 1 and 2 can be employed for introducing said fuel and air into inlets 18 and 18'. In the operation of the furnace of FIGURE 3, the combustible mixture formed in one of said inlets 18 and 18' would contain substantially the stoichiometric amount of air required for burning the fuel therein, and said combustible mixture would be burned in the presence of an amount of steam sufficient to protect the refractory lining of the inlet tunnel from excessive temperature.

The following example will serve to further illustrate the invention.

EXAMPLE I

A series of runs for the production of carbon black was carried out in a furnace embodying the essential features of the furnace illustrated in FIGURES 1 and 2. In the furnace employed, first section or zone 13 was 37 inches in diameter and 12 inches in length. Second zone or section 14 was 12 inches in diameter. Inlet tunnels 17 and 17' were 12 inches in diameter and had a length of approximately 24 inches along the short side thereof. The above dimensions are given by way of example only, are not lmiting on the invention, and any and all can be varied within the scope of the invention. The feedstock used in Run No. 1 was an aromatic concentrate oil obtained from commercial petroleum refining operations and having an API gravity of 0.8 and a BMCI value of 117. The feedstock used in Run No .2 was an oil of the same type having an API gravity of 0.9 and a BMCI value of 118. In said runs said feed stock was sprayed into the furnace in a substantially nonvaporized state. Operating conditions, yields of carbon black, and tests on the carbon black products are set forth in Table I below. Comparison of control Run No. 1 with Run No. 2, which was carried out in accordance with the invention, shows that the yield of carbon black was significantly higher in Run No. 2 than in Run No. 1.

TABLE I

| | Run Number | |
|---|---|---|
| | 1 | 2 |
| Feedstock: | | |
| BMCI [1] | 117 | 118 |
| Rate, gal./hr | 258 | 224 |
| Preheat temp., F | 405 | 405 |
| Air, Gas and Steam Rates: | | |
| Jacket air, M c.f.h | 4 | 4 |
| Total tangential air, M c.f.h | [2] 176 | [4] 176 |
| Total tangential gas, M c.f.h | [2] 11.73 | [4] 14.67 |
| Overall air/gas ratio | [3] 15.3 | [5] 12.3 |
| Steam, M c.f.h | | [6] 7.8 |
| Carbon Black Product: | | |
| Yield, lbs./gal. feedstock | 4.87 | 5.09 |
| Photelometer | 90 | 90 |
| $N_2$ Surface area, sq. m./g | 82 | 85 |
| Oil absorption, cc./100 g | 136 | 136 |

[1] Bureau of Mines Correlation Index.
[2] Split evenly between tangential inlet tunnels 17 and 17'.
[3] Essentially 153% of stoichiometric.
[4] Air/gas ratio of 10 (essentially 100% of stoichiometric) in tunnel 17, and air to gas ratio of 15 (essentially 150% of stoichiometric) in tunnel 17'.
[5] Essentially 123% of stoichiometric.
[6] In tunnel 17 only.

The above-described aromatic concentrate oils of the example represent one presently preferred feedstock for use in the practice of the invention. However, conventional aromatic oils used in the production of furnace carbon blacks can include oils other than extract oils produced by liquid sulfur dioxide extraction of cycle oils. Typical properties of conventional aromatic oils are: boiling range, 400–1000° F.; BMCI, 75 to 150; and an API gravity of from about 0 to about 20°.

The invention is not to be limited to the use of aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can be used. Further, hydrocarbons heavier than said gases can be used as charge, such as butane, pentane, or the like. Broadly, most any hydrocarbon can be used as feed in my process. However, the normally liquid hydrocarbons are preferred, and the normally liquid aromatic hydrocarbons are more preferred, because of the higher yields obtained therefrom. The feed can be injected as a liquid through a spray or atomizer, or the feed can be injected as a vapor. Hydrocarbons from other sources than petroleum likewise are suitable, as for example, low temperature coal gas, coal tar distillates, shale gases and distillates can be used. These feedstocks may contain most any class of hydrocarbon compound, as for example, saturated or unsaturated hydrocarbons, paraffins, olefins, aromatic, naphthenes, or any others which might become available.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In a process for producing carbon black by the pyrolytic decomposition of a hydrocarbon is a reaction zone in which at least a portion of the heat is supplied by oxidizing a fuel with a free oxygen-containing oxidant in a plurality of combustion zones communicating through the periphery of said reaction zone, the improvement comprising oxidizing a first portion of said fuel in at least one of said combustion zones with about 90 to 110 percent of the stoichiometric amount of said oxidant and oxidizing a second portion of said fuel in another of said combustion zones with an amount of said oxidant within the range of about 125 to 190 percent of the stoichiometric requirement, said first portion of said fuel being oxidized in the presence of a valume of water vapor from about 0.05 to about 1.25 times the volume of said free oxygen in said oxidant.

2. The process defined in claim 1 in which the free oxygen-containing oxidant is air.

3. The process as defined in claim 2 in which the overall air to fuel ratio is in excess of stoichiometric.

4. The process as defined in claim 1 in which the water vapor is introduced into said combustion zone in the form of steam.

References Cited

UNITED STATES PATENTS

| 3,431,075 | 3/1969 | Gunnell | 23—209.4 |
| 2,623,811 | 12/1952 | Williams | 23—209.4 X |
| 2,781,250 | 2/1957 | Millers | 23—259.5 |
| 3,009,784 | 11/1961 | Kresci | 23—209.4 |

EDWARD J. MEROS, Primary Examiner